UNITED STATES PATENT OFFICE 2,486,105

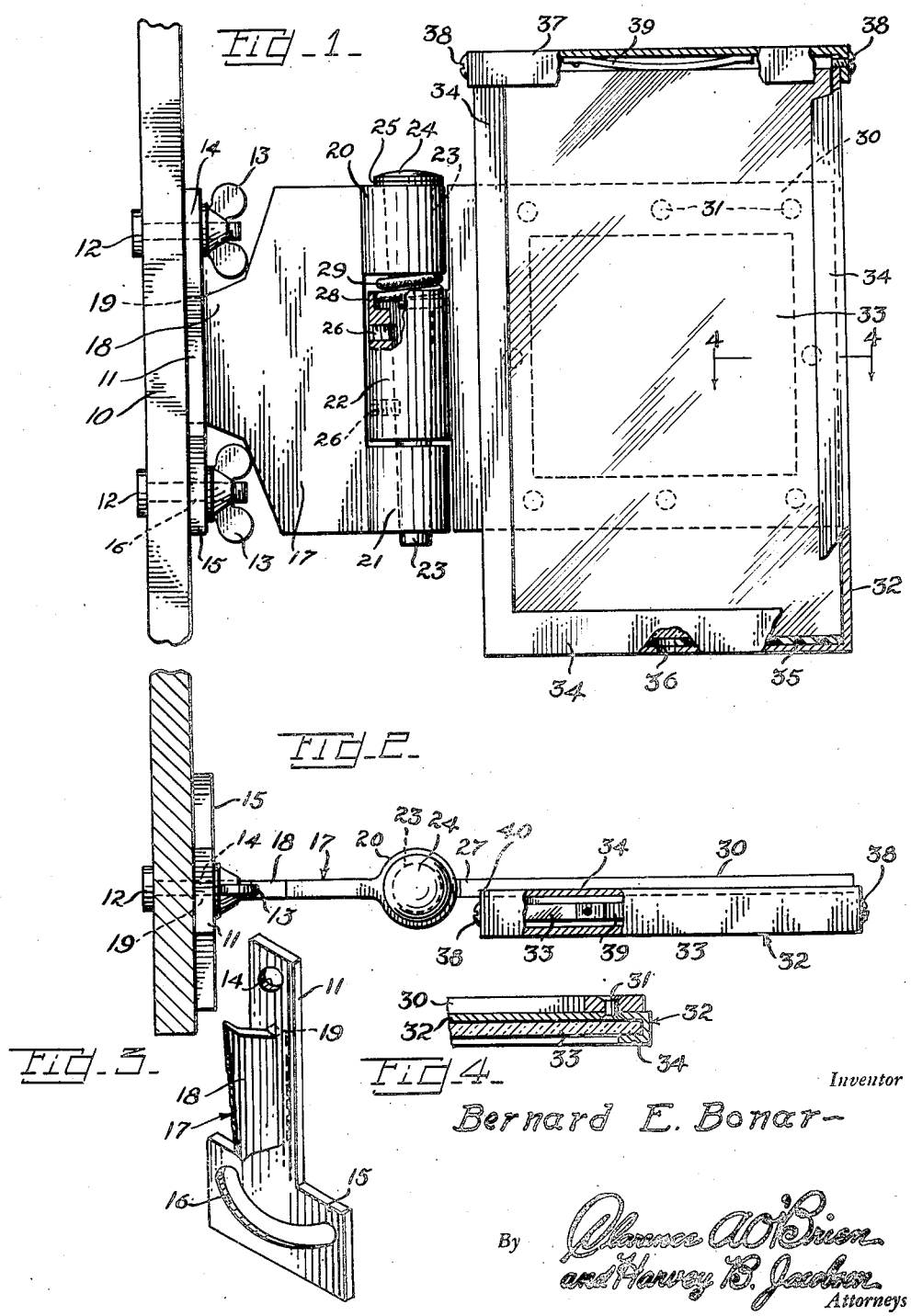

REARVIEW MIRROR

Bernard E. Bonar, El Paso, Tex., assignor of one-fourth to Bernard R. Bonar and one-fourth to Byron L. Bonar, both of El Paso, Tex.

Application February 2, 1946, Serial No. 645,061

5 Claims. (Cl. 88—93)

This invention relates to train protection or rear view mirrors adapted to be used on the cabins of locomotives, either Diesel, steam or electrical, so that the engineer or fireman may view the train in rear thereof and observe any untoward condition which might cause an accident, such as hot boxes, burning or other defectiveness in the equipment.

Another object of the invention is to provide a train protection or rear view mirror which may be fastened to the side of a cab, so that an engine man may keep a close watch on the sides of the train at all times, without sacrificing the necessary alertness ahead, and permit observation of switching movements which are thereby expedited, hot boxes, brakes sticking, wheels sliding and practically all adverse hazardous conditions which can be instantly detected, thereby insuring safety of travel.

Another object of the invention is to provide a train protection or rear view mirror which can be adjusted at the proper angle or tilt in order to permit clearer view by the engineer or fireman through a cab window, and which will stay in any position in which it is adjusted, and may be folded to the side of the cab when not in use.

Other objects and advantages reside in the details of construction and operation as more fully hereinafter described and claimed, reference being had to the accompanying drawings forming part hereof, wherein like numerals refer to like parts throughout, and in which:

Figure 1 is a front elevation of a train protection or rear view mirror of one type constructed in accordance with the invention and attached to the side of a cab, the same being partly broken away and in section.

Figure 2 is a plan view of the device as shown in Figure 1 partly broken away and in section.

Figure 3 is a fragmentary perspective view showing the attaching bracket and adjusting means.

Figure 4 is a fragmentary horizontal sectional view taken on the line 4—4 of Figure 1.

Referring to the drawings in detail, in which like reference characters designate corresponding parts throughout the several views, 10 designates the side of a cab or the like of a locomotive or other vehicle, which may be of Diesel, steam or electrical type. An inverted T-shaped bracket plate 11 is bolted to the frame of the cab and through the same, as indicated at 12, and the bolts engaged by wing nuts or the like 13 for securing the bracket plate 11 in position. This plate has an opening 14 at the top for receiving the upper bolt 12, and the enlarged lower portion or cross member 15 corresponding to the T-head, is provided with an arcuate slot 16 concentric to the hole 14, through which the bolt 12 at the bottom may be adjusted to dispose the bracket at different inclinations or angles of tilt, so as to secure proper view of the equipment in rear of the cab, at the side of the train and at the proper height, whereby the engineer may keep a close watch on his train at all times, without sacrificing the necessary alertness ahead, as well as switching movements which are thereby expedited, hot boxes, brakes sticking, wheels sliding and practically all adverse hazardous conditions which may be detected immediately as will be hereinafter more clearly pointed out. A bracket plate 17 is rigidly attached perpendicularly to the plate 11 and for this purpose, has a reduced central portion 18 at its inner end which is secured within a vertical slot 19 in the plate 11 and formed with upper and lower hinge sleeves 20 and 21 cooperating with an intermediate hinge sleeve 22 to receive a tapered hinge pin 23 throughout its length and having an enlarged head or dust cap 24 resting upon the top sleeve 20 with an intermediate rubber gasket or washer 25. Allen set screws 26 are engaged through the sleeve 22 and with the pin 23, in order to secure the sleeve 22 in adjusted position vertically on pin 23 spaced from sleeves 20 and 21. This is for the purpose of regulating the horizontal angle of the mirror in addition to the adjustment of the tilting angle thereof by the lower bolt 12 and slot 16 with the upper bolt 12 forming a pivot or fulcrum for the bracket plate 11, as previously described.

The sleeve 22 is formed on the other hinge leaf consisting of a plate 27 and as shown, the sleeves 20 and 21 are made shorter than the sleeve 22, while the latter is provided with a recess or seat 28 in its upper end to receive an expansible coil spring 29 which acts between the sleeves 20 and 22 to prevent vibration and to frictionally retain the two parts in connection and in position when adjusted angularly with respect to each other. The tension of spring 29 and friction between sleeves 20 and 22 may be regulated by vertical adjustment of sleeve 22 on pin 23. The plate 27 is formed as a rectangular frame 30 which is riveted or otherwise fastened as shown in 31 to the back of a flat rectangular casing 32 in which the mirror 33 is adapted to be secured. The front of the mirror case is open and has a molding or flange 34 forming a frame retaining the mirror in position and extending along the vertical sides and bottom of the casing as clearly shown in the drawings. The mirror at its bottom edge rests upon a rubber or like cushion 35 to absorb shock, and drain openings 36 are provided in the bottom to permit the escape of moisture from within the case. The case or casing 32 is secured intermediately of its height to the bracket frame 30 and is U-shaped or open at the top, which is closed by a removable top cover or flanged cap 37 held by set screws 38 engaged through the ends thereof and through the intermediate or bight portions of the channels forming the frame in conjunction with the flange 34 at the surrounding front edges of the casing, so as to secure the cap in position. A bow or other like spring 39 is also provided in the cap at the under surface of its top wall to engage the top edge of the mirror 33, in order to prevent rattling or vibration thereof, and this is facilitated and assisted by having the casing 32 fit in a recess in the plate 27 as indicated at 40, in Figure 2 of the drawings.

While in the foregoing there has been shown and described the preferred embodiment of this invention it is to be understood that minor changes in the details of construction, combination, and arrangement of parts may be resorted to without departing from the spirit and scope of the invention as claimed.

I claim:

1. A train protection rear view mirror comprising a bracket plate positioned flat against the side of a cab and anchored at one end to the cab, said plate being formed with an arcuate slot at its other end, said anchored end forming a fulcrum for the plate, clamping means associated with the cab and slot for locking the plate in adjusted angular positions about the anchored end, a web portion projecting at right angles from said plate, a pair of vertically opposed and aligned sleeves carried by the outer end of the web, a mirror casing, a sleeve projecting from said casing and interposed between and aligned with said sleeves on the web, a pivot pin inserted through all of said sleeves and means operatively associated with said pin for retaining the casing in selected positions about the pin.

2. A rear view reflector mirror construction comprising a bracket plate positioned flat against a vertical support and anchored at one end to the support, said plate being formed at its other end with a slot of arcuate formation concentric to the anchored end, said anchored end forming a horizontal fulcrum for the plate, clamping means engaged to the support and slot to angularly adjust the plate about the anchored end, a web portion extending at right angles from said plate, a vertical pivot element operatively connected to the free end of the web, a mirror casing pivoted on the pivot element, a mirror protectively mounted in the casing, and resilient means operatively associated with said pin for retaining said casing in adjusted positions about said pin.

3. A train protection rear view mirror comprising a bracket plate pivotally attached at one end to a cab, an arcuate slot transversely formed in the other end of said plate, clamping means associated with the slot for locking the plate in selected angular positions about its pivoted end, a connecting plate extending at right angles from said bracket plate and having vertically opposed sleeves, a mirror casing, a sleeve extending laterally from said casing and swivelly interposed between and aligned with the vertically opposed sleeves, a pivot pin disposed through all of said sleeves and resilient means associated with said pin for retaining said casing in adjusted positions about said pivot pin.

4. A rear view reflector construction comprising a bracket plate, a pivot member disposed at one end of said plate for attaching the plate to a support, an arcuate slot transversely formed in the other end of the plate, clamping means operatively connected to the support and disposed in the slot for locking the plate in selected angular position about the pivot member, a connecting web associated with said plate and extending at right angles therefrom, a pair of vertically opposed sleeves carried by said web, a mirror casing, a mirror protectively mounted in said casing, a sleeve extending from said casing and rotatably interposed between and aligned with the sleeves on the connecting plate, a tapered pivot pin vertically disposed through all of said sleeves and resilient means disposed on said pin for retaining said casing in adjusted positions about said pin.

5. The combination of claim 2, wherein said clamping means includes a bolt disposed through the slot in the plate and through the support, locking means received on said bolt and bearing against the bracket plate.

BERNARD E. BONAR.

REFERENCES CITED

The following references are of record in the file of this patent:

UNITED STATES PATENTS

| Number | Name | Date |
| --- | --- | --- |
| 184,050 | Richards | Nov. 7, 1876 |
| 881,771 | Cain | Mar. 10, 1908 |
| 1,399,461 | Childs | Dec. 6, 1921 |
| 1,684,560 | Scott | Sept. 18, 1928 |
| 1,748,849 | Schmidt | Feb. 25, 1930 |
| 1,810,435 | Paulson | June 16, 1931 |
| 1,910,119 | Moats | May 23, 1933 |
| 2,424,222 | Brown | July 22, 1947 |

FOREIGN PATENTS

| Number | Country | Date |
| --- | --- | --- |
| 325,301 | Great Britain | Feb. 20, 1930 |